United States Patent [19]
Ferrara

[11] Patent Number: 5,139,840
[45] Date of Patent: Aug. 18, 1992

[54] TRAPEZOIDALLY-SHAPED RUBBER PATCH FOR PATCHING THE SIDEWALL OF RADIAL PLY TIRES TO BE REPAIRED OR RETREADED

[75] Inventor: Giuseppe Ferrara, Bari, Italy

[73] Assignee: R.F.P. S.r.l. - Ricostruzione Fascia Prestampata, Modugno, Italy

[21] Appl. No.: 379,870

[22] Filed: Jul. 14, 1989

[30] Foreign Application Priority Data

Jul. 27, 1988 [EP] European Pat. Off. ........ 88112076.0

[51] Int. Cl.⁵ .................... B29C 73/00; B29C 73/06
[52] U.S. Cl. ............................. 428/78; 428/175; 428/217; 428/63; 152/367; 152/370; 156/97
[58] Field of Search .................. 428/63, 78, 79, 217, 428/175; 152/370, 367; 156/97, 95

[56] References Cited
U.S. PATENT DOCUMENTS

| | | |
|---|---|---|
| 4,285,382 | 8/1981 | DiRocco et al. |
| 4,399,854 | 8/1983 | Dirocco et al. ............ 152/367 |
| 4,836,930 | 6/1989 | Hill .......................... 156/97 |

FOREIGN PATENT DOCUMENTS

1505881 7/1970 Fed. Rep. of Germany .
1211507 3/1960 France .

Primary Examiner—Alexander S. Thomas
Attorney, Agent, or Firm—Collard & Roe

[57] ABSTRACT

A trapezoidally-shaped rubber patch for patching the sidewall of a radial-ply tire with broken or damaged cords. The rubber patch has a first layer of rubber containing radial metallic cords and at least one second layer of rubberized fabric with synthetic cords under the first layer. Beneath the second layer is at least one third layer of rubber. The patch has a knurled attachment surface for attaching it to a coresponding knurled tire attachment surface. The rubber patch also has a trapezoidally-shaped rubber plug extending outwardly from the attachment surface. The rubber plug fits into a window which is cut in the sidewall of the tire in the area of the broken or damaged cords. The first layer of rubber is raised with respect to the attachment surface. The first layer of rubber is as wide as the base of the plug in the area beneath it.

6 Claims, 4 Drawing Sheets

TRAPEZOIDALLY-SHAPED RUBBER PATCH FOR PATCHING THE SIDEWALL OF RADIAL PLY TIRES TO BE REPAIRED OR RETREADED

BACKGROUND OF THE INVENTION

1. Field of the Invention

The present invention relates to a rubber patch for repairing both tubeless and tube-type tires, with a radial-ply structure, in which three or more of the metallic cords in their sidewalls have been strained or broken. The rubber patches can be applied both to tires which need repairing and to one which require retreading.

2. The Prior Art

The previous trapezoidally-shaped rubber patches, invented by the same applicant, were intended to replace the traditional rectangular patches. These consisted of several superimposed layers of fabric made of synthetic fibers and metallic cords and have indeed most successfully resolved the problem of repairing and retreading radial-ply tires with damaged sidewalls. However, it was realized that these new rubber patches needed further improving to eliminate the problems arising from their application, problems which are listed below:

(1) The impossibility of placing the rubber patches with their metallic cords exactly parallel to and overlying the still good parts of the metallic cords of the tire which need repairing. This is because it is impossible to find the areas in the rubber patches where these cords have been inserted. Consequently, for this operation to be done to perfection it takes a long time.

(2) During vulcanization of the rubber patches to the tire, the former may be shifted by the thrusting pressure of the upper part of the mold on the rubber patch itself, especially at the edges of rubber patch beneath the rubber plug; after vulcanization and inflating for use, this may cause localized bulges in the tire because the cords of the plug and the ones in the tire are not perfectly parallel.

(3) The need, in order to apply the patches, to remove the inside layers of rubber covering the radial cords of the tire for all the area of the patch. This is because the attachment surface of the rubber patch itself, including the layer of rubber with metallic cords, is completely flat and, therefore, it is necessary to create a cavity with a surface area equal to that of the whole rubber patch if the metallic cords of the patch are to directly touch those of the tire.

Furthermore, during the manufacture of the rubber patch, slight distortions occur in the layer of rubber with metallic cords, in the layers of butyl rubber, and in the rubber fabrics during molding and vulcanization.

SUMMARY OF THE INVENTION

It is therefor an object of the present invention to eliminate the above drawbacks, improving on the above-mentioned trapezoidally-shaped rubber patches.

The invention, as described in this claim, does in fact solve the problem of how to make it easy for the operator to position the patch exactly in the right place, i.e., where the metallic cords of the tire are broken. In other words, this invention enables the operator to place the metallic cords of the rubber patches exactly over the broken ones of the tire, without having to remove the rubber from around the good surrounding cords.

Moreover, this invention solves the problem of how to make a rubber patch in which the layer of rubber containing the metallic cords is raised above the attachment surface of the patch itself.

Yet another problem which the invention resolves is that of how to keep the rubber patch firmly attached to the tire while the tire is moved around during the various phases of retreading before the under layer of the patch is actually vulcanized to the tire.

The rubber patch, according to this invention, is described in detail below with the references to the drawings which explain what is believed to be the best way (though further improvements may eventually be made) to perform each step.

DETAILED DESCRIPTION OF PREFERRED EMBODIMENTS

Figure 1A:
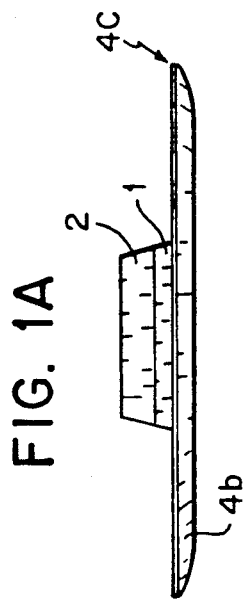
FIG. 1A is a left-side elevational view of the rubber patch according to the invention.
Figure 1E:
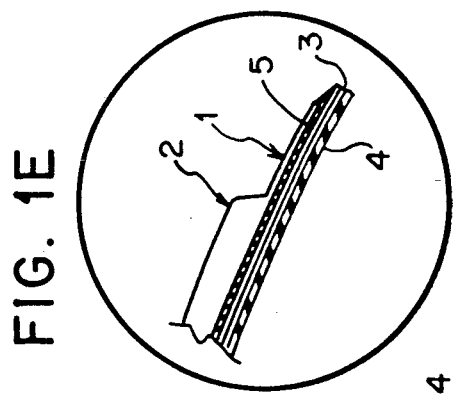
FIG. 1E is an enlarged view of a portion of FIG. 1C

In the rubber patch described by this invention (see FIGS. 1-5), a layer of rubber or relief layer 1 containing the radial metallic cords 5 is in relief with respect to the attachment surface of the rubberized fabric 3 with synthetic cords parallel or non-parallel to its longitudinal axis A—A or, if this latter is not present, of the rubber layer 4A and has a trapezoidal shape. In other words, it has a variable width, like the base of the trapezoidal plug 2 which is superimposed over it and like what can be obtained by drawing out the sides of the base of the plug itself, so that the relief layer is long enough to touch the bead on one end and the tread on the other. This makes it possible to fix the rubber patch accurately, in other words, with the metallic cords exactly overlying and parallel to the cords of the tire beneath and above the window F.

In order to apply the rubber patch, the tire rubber has to be cut in the area of greatest flection on the outside, first following the direction of the radial metallic cords and then crosswise so as to remove the parts of the metallic cords which have been damaged or broken so as to make (see FIG. 3) a window F whose shape and size exactly fit the plug 2.

Therefore, for each sector of application (where the tire is used), i.e., depending on the size and use of the tire, there may be rubber patches of different sizes depending on the width and length of the plug. In other words, there may be plugs to fit a window whose width covers three broken cords, or a plug which fits a window whose width covers four or more broken cords. This is because, in cutting the sides of the window radially, one must keep strictly within the space between two cords and, since this interspace is just a few millimeters, the transversal dimensions of the windows are strictly tied to the number of broken cords or, in other words, to those of the plugs.

After cutting the window F, a channel C must be cut in the internal surface of the tire. This channel must be as wide and deep as the relief layer 1 of the rubber patch is wide and thick, and it must be long enough to reach the bead at one end and the tread at the other. Around the window and channel C, FIG. 3, the internal surface of the tire M is ground, covering a surface area almost equal to that of the rubber patch, except for a few millimeters around the rounded edges 4c, so as to remove just the layer of butyl rubber and create a cavity to house the layers 4 of the rubber patch itself. The rounded edges 4c, FIG. 2, are put down and then vulcanized against the internal surface of the tire which includes the injured zone M, so as to obtain sealing against pressurized air which is required by tubeless tires.

Figure 2:
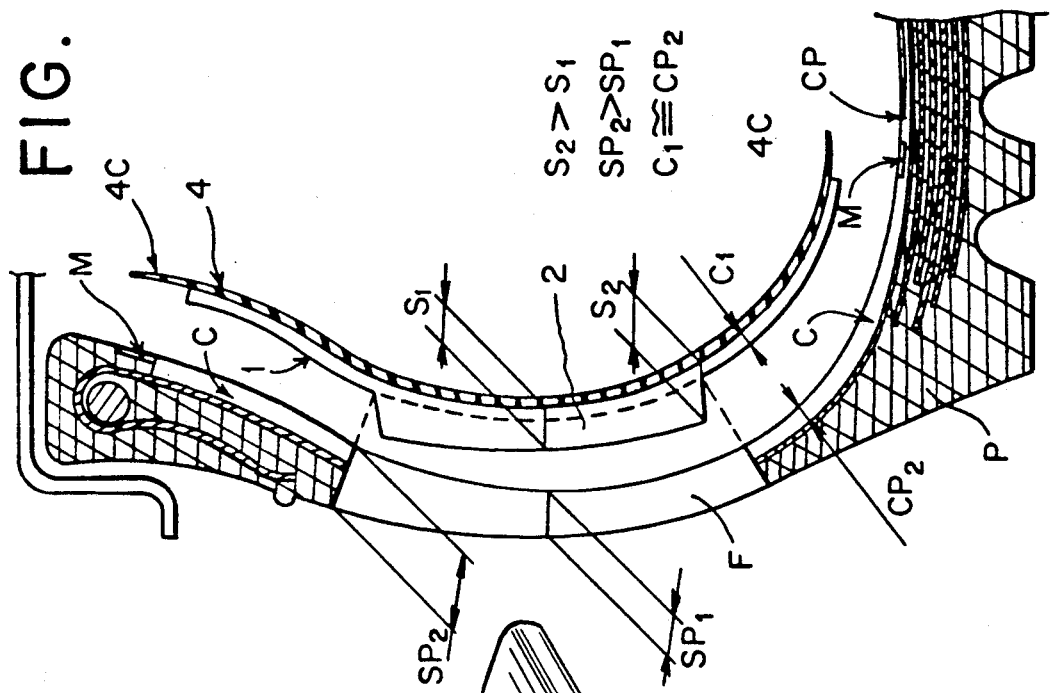
FIG. 2 is a schematic view showing the dimensions of the rubber patch in relation to those of the tire where it is to be applied.
Figure 3:
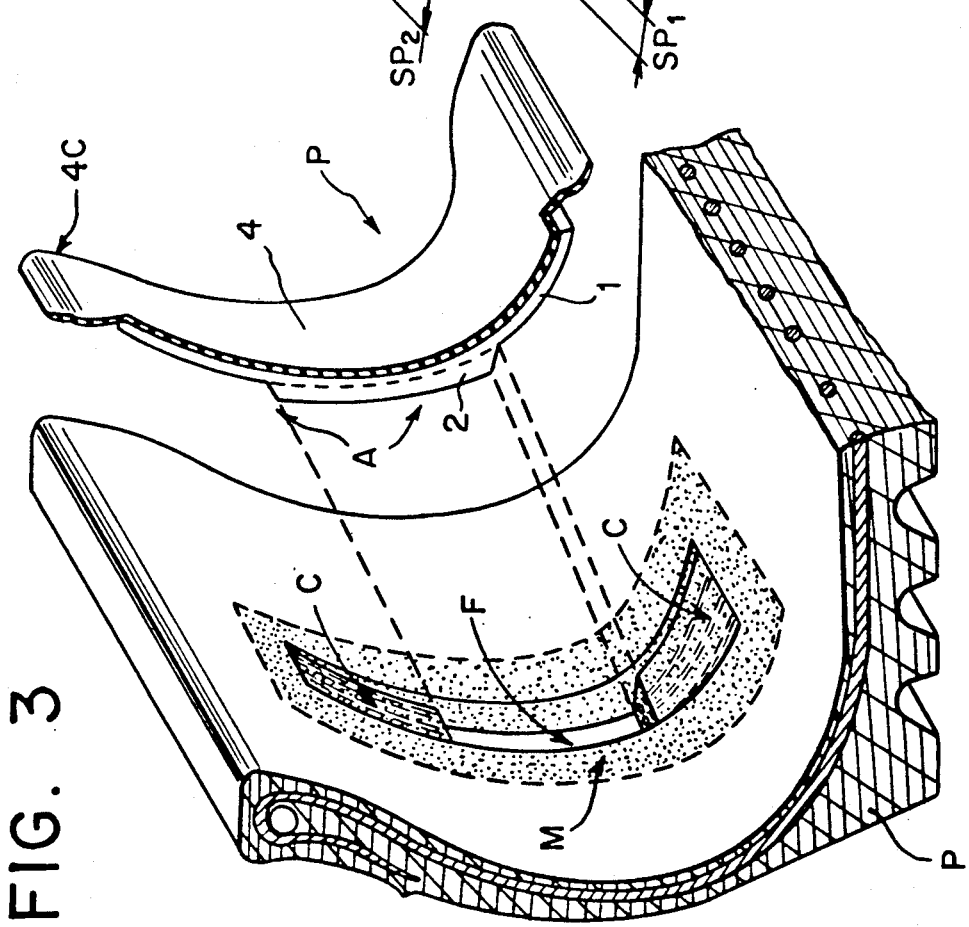
FIG. 3 is a perspective view showing how to apply the rubber patch.

As the operator has to place the rubber patch in the channel C, FIGS. 2 and 3, the relief layer 1 means that the metallic cords of the rubber patch just lie over the cords of the tire from which the damages parts have been removed. This also means that the rubber patch is kept in the correct position during retreading before vulcanization.

Figure 4:
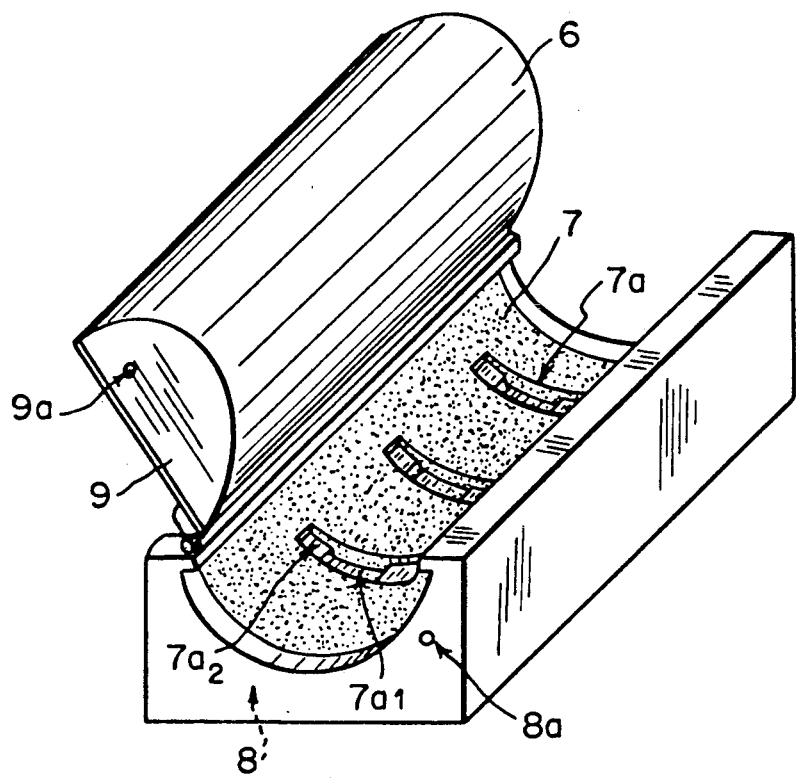
FIG. 4 is a perspective view of the mold needed for the rubber patch manufacturing process.
Figure 5:
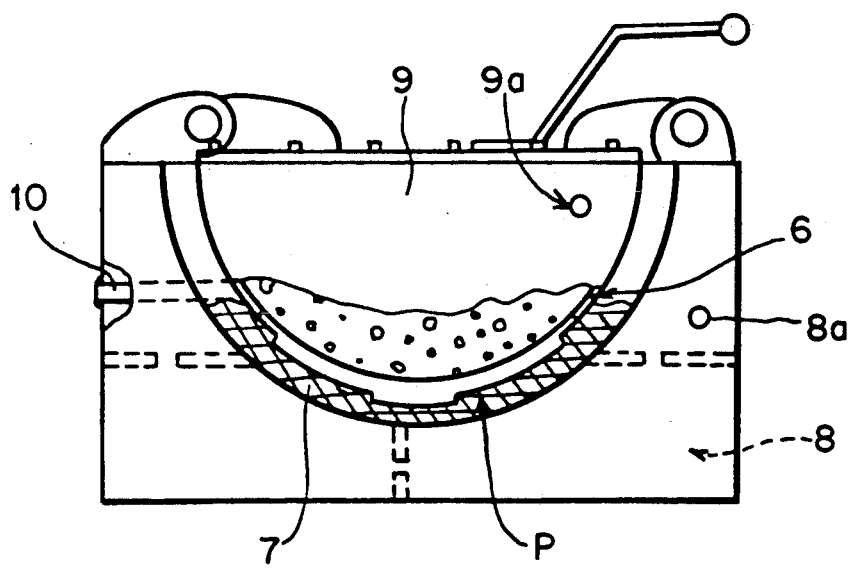
FIG. 5 is a left-side cross-sectional view in part showing the mold during vulcanization and rubber patch pressing.

The manufacturing procedure is based on a semi-cylindrical mold 7 made of a layer of rubber of an appropriate thickness (for example, 15 mm), FIGS. 4 and 5. The rubber layer is heated up by a steam system 8, so as to be able to perform the vulcanization after pressing. In this mold, in correspondence with the plug, FIG. 1D, an impression $7a1$ which are to form the rubber patch, have a depth h1 approximately equal to the sum h of the thicknesses of the plug 2 plus rubber layer 1 (i.e., if possible, the depth is equal to the thickness of plug 2 plus three-quarters of rubber layer 1). In the zones corresponding to those above and below the plug out of which only the layer of rubber containing the metallic cords 1 must protrude, the depth of an impression $7a2$ is just equal to the thickness of layer 1, or, if one prefers, to three-quarters of said thickness.

An impression $7a$ has a trapezoidal shape and a width which varies along the longitudinal axis like the width of the base of the plug and the extension of its sides.

Figure 6A:
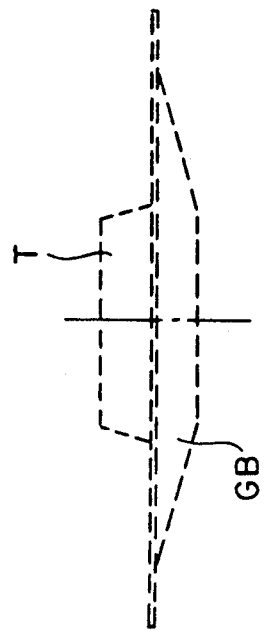
FIG. 6A is a left-side elevational view of the prior art patch.
Figure 6:
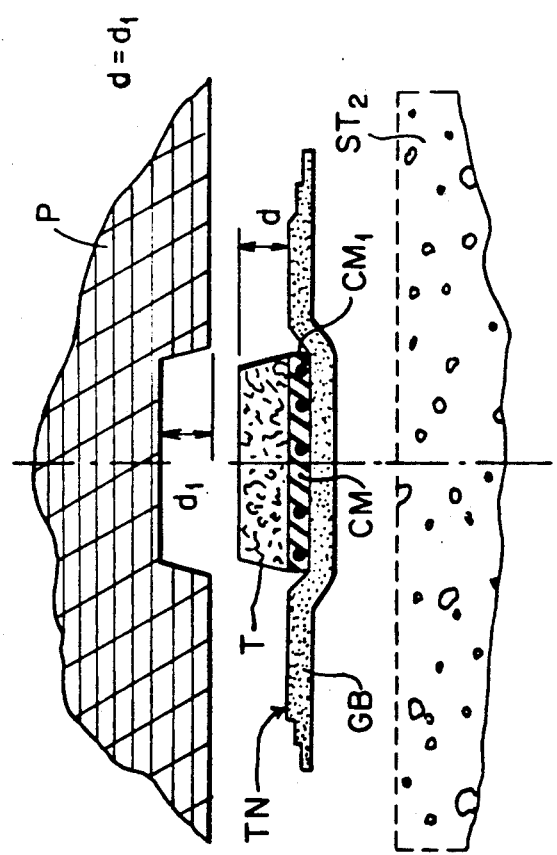
FIG. 6 is a schematic view of the prior art trapezoidally-shaped rubber patch.
Figure 6B:
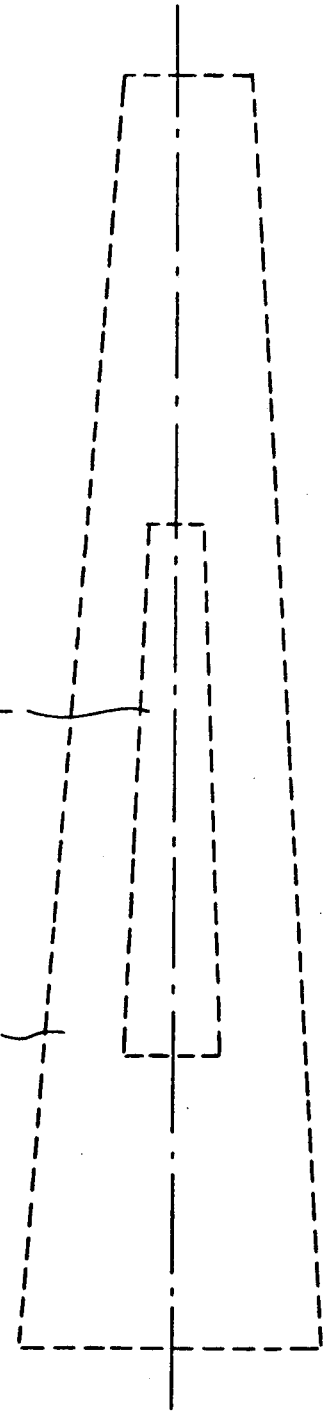
FIG. 6B is a plan view of the prior art patch.

In the mold for forming the old version of the rubber patch, as shown in FIG. 6 (see Italian Patent No. 2101/A87 and European Patent No. 87114126.3), there was just one impression with a depth d1 equal to that of a thickness d of the plug. In the improved rubber patch discussed here and shown in FIGS. 1 and 4, there is an impression $7a1$ of a depth equal to the sum of the thicknesses of the plug 2 and of rubber layer 1. Along the longitudinal axis of this impression, there are two impressions $7a2$ which have a depth approximately equal to the thickness of the rubber layer 1.

This makes it possible to obtain a plug 2 whose rubber layer 1 is in relief with respect to the attachment surface which consists of the layer of rubberized fabric 3 or, if this is not present, of the layers of rubber 4 (see FIG. 1A). Thus, distortions of layers 1 and 4 due to the thrusting pressure of the upper part of the mold 7 can be avoided around layer 1 itself.

Furthermore, as thickness S2 (FIG. 2) (the sum of the thicknesses of plug 2 and rubber layer 1 which is on the tread and beads of the plug itself) must be equal to the corresponding thickness in the sidewalls of the tire. It must be greater than thickness S1 at the middle of the plug 2, as is the case in the sidewall of the tire. Thus, FIG. 1C, the longitudinal section of the impression $7a$ of the mold for the plug varies in such a way that S2 is greater than S1.

The upper part 6 of mold 7, FIGS. 4 and 5, is semi-cylindrical. It is obtained by pumping air and steam at a suitable pressure into a chamber made of a sheet of rubber of a certain thickness attached to two semi-circular plates 9.

Figure 1D:
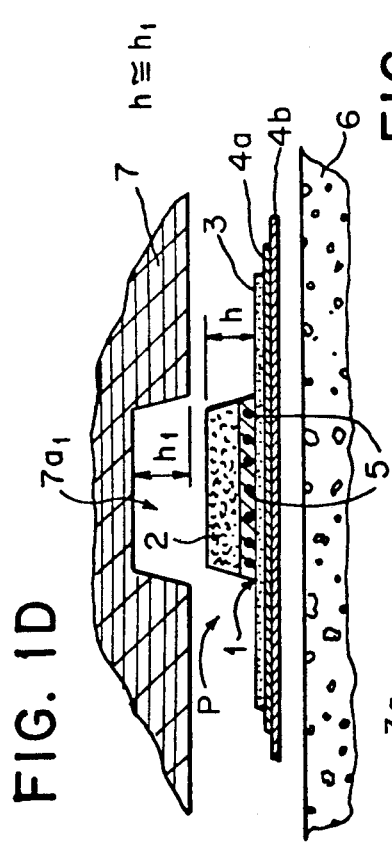
FIG. 1D is a cross-sectional view taken along the line AA.
Figure 1B:
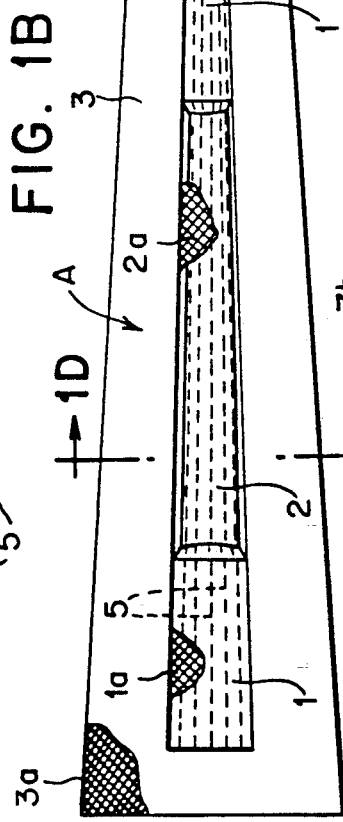
FIG. 1B is a plan view thereof.
Figure 1C:
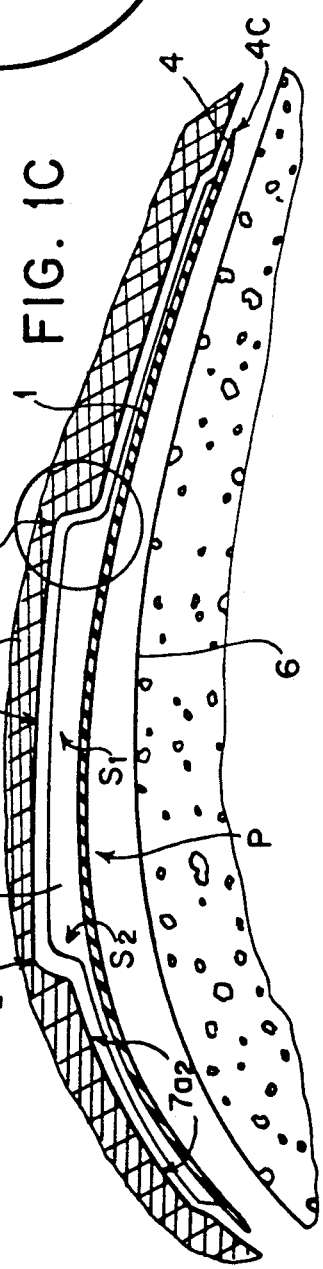
FIG. 1C is a front elevational view of the rubber patch and the mold.

The cross-section, FIG. 1D, of impression $7a$ of mold 7 in correspondence with plug 2 is slightly trapezoidal, whereas its longitudinal section, FIG. 1C, at the end $7b2$, has a height S2 greater than height S1 in the middle $7b1$, so that in the resulting plug the height S2 at the ends is greater than height S1 at the center.

In order to form window F and channels C where the rubber patch is to be inserted and to grind the inside part of tire M for the flat part of the rubber patch, templates of different sizes can be used for each kind of tire which also indicate where to make the transversal cuts.

Both the flat surface 3 and the surface of raised layer 1 and of plug 2 (FIG. 1B) are knurled (see $3a$, $1a$, and $2a$). Also, the free surface of the butyl layer $4b$ is knurled. The rubberized fabric 3 can also be eliminated so as to reduce the number of layers making up the rubber patch to the layers of: plug 2, raised rubber layer containing metallic cords 1, and layers $4a$ and $4b$ in elastic rubber. In this latter case, the thickness of rubber layer $4a$ is increased.

The rubberized fabric 3 may have its weft not parallel to the longitudinal axis described in European Patent No. 87114126.3 advanced by the same applicant.

The whole manufacturing process comprises the following phases:

(a) punch cutting the raw rubber parts (which form the rubber patches of one or more series) to the sizes required and in a trapezoidal shape. To do this, one uses sheets of suitable rubber, rubber fabric 3 with synthetic cords parallel or non-parallel to their longitudinal axis A—A, and sheets of rubber containing radially arranged metallic cords.

(b) laying the various raw rubber parts of the rubber patch on top of one another and bonding them together using solvents or other suitable means.

(c) pressing using a mold base and semi-cylindrical upper part which enables the right curvature to be obtained; vulcanization of the rubber patch, creating a convex surface facing the attachment surface; the precise application of the raised rubber layer containing the radially-arranged metallic cords onto the rubberized fabric layers or, if these are not present, onto rubber sheets 4. The surfaces of the mold base and upper part are treated in such a way as to cause the knurling of the surfaces of each rubber patch. The attachment surface is also covered by a layer of polyester.

The rubber patch can be put on sale without the underlying attachment layer or with an underlying attachment layer which can be vulcanized at a low or high temperature.

I claim:

1. A trapezoidally-shaped rubber patch for patching the sidewalls of a tubeless or tube-type radial-ply tire having injuries with more broken or injured cords, comprising:
- a rubber plug to insert into a window cut in the sidewall of the tire, from which the rubber embedding the broken and injured cords have been removed, the window cut having the same longitudinal and cross sections of the plug itself;
- beneath said plug and connected to it as to be an integral part of the plug itself, a first layer of rubber embedding radial metallic cords;
- beneath said first layer one or more second layers of rubberized fabric embedding synthetic cords deviated with respect to the longitudinal axis of the patch;
- beneath this second layer, one third layer formed by two layers of rubber of different resilience and hardness;
- the patch having both the attachment surface including the plug and the opposite surface that are knurled, the patch itself being manufactured in manner to be permanently bent along its longitudinal symmetry axis in manner that the bending radius be similar to the bending radius of the tire and so that its convexity faces the attachment surface of the inner sidewall of the tire;
- the first layer of rubber containing the radial metallic cords being raised in relief with respect to the surface of the second layer or, if this layer of fabric is not present on the third layer of rubber only, the first layer of rubber having the same shape and dimension of the base of the plug in the area beneath it, and its lower and upper prolongations having widths that are the extensions, in both directions, of the trapezoidal shape of the base of the plug itself.

2. A trapezoidal-shaped rubber patch as claimed in claim 1, wherein the rubber plug has a truncated pyramid shape;
- the surface of the underlying first rubber layer embedding radial metallic cords, being of trapezoidal shape;
- said first rubber layer being raised in relief on the second layers of fabric, or if these layers of fabric are not present, then on the third layer of rubber that has a grater area and also has a trapezoidal shape;
- the surface opposite to the attachment surface being made of a layer of rubber suitable to obtain the air-tightening of tubeless radial-ply tires and with blunted edges;
- both thicknesses of the rubber plug at its ends being greater than the thickness at the center of the plug itself;
- the overall thickness of the plug and of the layers embedding metallic and synthetic cords being equal to the corresponding thickness of the sidewalls of the tire in correspondence of the area of the window cut form which the rubber embedding the broken or injured cords has been removed.

3. A trapezoidal-shaped rubber patch as claimed in claim 2, wherein the plug has a length such as the radial length of the area of greater flexibility of the tire included between the bead and the exact opposite edge of the belt.

4. A trapezoidal-shaped rubber patch, permanently bent along its symmetry axis as claimed in claim 1, wherein the first layer of rubber embedding radial metallic cords is raised in relief on the surface of the second layers of rubberized fabric or, if this layer is not present, on the surface of the third rubber layer only.

5. A trapezoidal-shaped rubber patch, bent along its symmetry axis as claimed in claim 1, wherein the bending of the rubber patch along its symmetry axis is made by vulcanization during its manufacturing, before the application onto the inner sidewalls of a tubeless or tube-type radial play tire.

6. A trapezoidal rubber patch, as claimed in claim 1, wherein the plug is an integral part of the rubber patch itself.

* * * * *